(12) United States Patent
Munro et al.

(10) Patent No.: US 8,135,276 B2
(45) Date of Patent: Mar. 13, 2012

(54) QUANTUM REPEATER

(75) Inventors: William J. Munro, Bristol (GB); Kae Nemoto, Tokyo (JP); Peter Van Loock, Tokyo (JP); Yoshihisa Yamamoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 858 days.

(21) Appl. No.: 11/990,421

(22) PCT Filed: Aug. 11, 2006

(86) PCT No.: PCT/US2006/031396
§ 371 (c)(1),
(2), (4) Date: Feb. 12, 2008

(87) PCT Pub. No.: WO2007/021945
PCT Pub. Date: Feb. 22, 2007

(65) Prior Publication Data
US 2009/0097862 A1     Apr. 16, 2009

(30) Foreign Application Priority Data
Aug. 12, 2005   (GB) .................................. 0516565.9

(51) Int. Cl.
*H04K 3/00*          (2006.01)

(52) U.S. Cl. ............ 398/39; 398/40; 398/173; 398/175; 398/180; 380/255; 380/256; 250/251

(58) Field of Classification Search ............... 398/25, 398/30–33, 15, 80, 82, 86–88, 151, 168–170, 398/173, 175–83, 192, 201, 202, 212
See application file for complete search history.

(56) References Cited

U.S. PATENT DOCUMENTS
2004/0200952 A1* 10/2004 Beausoleil et al. ......... 250/214.1
2008/0310000 A1* 12/2008 Beausoleil et al. ........... 359/108

FOREIGN PATENT DOCUMENTS
JP       2005-136721      5/2005
WO    WO2004/093003 A2  10/2004

OTHER PUBLICATIONS

Childress, L. et al., "Fault-tolerant quantum repeaters with minimal physical resources, and implementations based on single photon emitters", arXiv:quant-ph/0502112 v 1, pp. 1-16 (Feb. 18, 2005).
Duan, L.-M. et al., "Long distance quantum communication with atomic ensembles and linear optics", arXiv:quant-ph/0105105 v1, 11 pages (May 22, 2001).

(Continued)

*Primary Examiner* — Li Liu (57) ABSTRACT

A quantum repeater includes a transmitter portion including a source, a set of matter systems, and an optical system. The source produces a probe pulse in a probe state having components with different photon numbers, and each matter system has at least one state that interacts with photons in the probe pulse to introduce a change in a phase space location of the probe state. The optical system can direct the probe pulse for interaction with one of the matter systems and direct light from the matter system for transmission on a first channel.

26 Claims, 5 Drawing Sheets

OTHER PUBLICATIONS

Duan, L.-M. et al., "Long distance quantum communication with atomic ensembles and linear optics", Nature, vol. 414, pp. 413-418 (Nov. 22, 2001).

Dur, W. et al., "Quantum repeaters based on entanglement purification", arXiv:quant-ph/9808065 v 1, pp. 1-19 (Aug. 31, 1998).

Genoni, Marco G. et al., "Optimal quantum repeaters for qubits and qudits", Physical Review A, vol. 71, No. 5, pp. 052307-1 to 052307-5 (May 6, 2005).

Kok, Pieter et al., "Practical quantum repeaters with linear optics and double-photon guns", arXiv:quant-ph/0203134 v1, pp. 1-4 (Mar. 27, 2002).

Opatrny, T. et al., "Coupled cavities for enhancing the cross-phase-modulation in electromagnetically induced transparency", Physical Review A, vol. 64, pp. 023805-1 to 023805-9 (Jul. 9, 2001).

Pellegrin, S. et al., "Nonadiabatic decoherence control of qubits strongly coupled to continuum edge", arXiv:quantph/0410115 v1, pp. 1-7 (Oct. 14, 2004).

Van Loock, P. et al., "Practical quantum repeater using intense coherent light", arXiv:quant-ph/0510202 v1, pp. 1-7 (Oct. 26, 2005).

Van Loock, P. et al., "Hybrid Quantum Repeater Using Bright Colored Light", Physical Review Letters, vol. 96, No. 24, pp. 240501-1 to 240501-4 (Jun. 23, 2006).

Yan, Min et al., "Nonlinear absorption by quantum interference in cold atoms", Optics Letters, vol. 26, No. 8, pp. 548-550 (Apr. 15, 2001).

Zhao, et al., "Experimental Realization of Entanglement Concentration and a Quantum Repeater", arXiv:quant-ph/0301118 v1, pp. 1-15 (Jan. 22, 2003).

D.N. Matsukevich, T. Chaneliere, M. Bhattacharya, S.Y. Lan, S.D. Jenkins, T.A.B. Kennedy and A. Kuzmich, "Entanglement of a photon and a collective atomic excitation", [online], arXiv, Jul. 17, 2005, quant-ph/0507161v1, URL: http://arxiv.org/abs/quant-ph/0507161v1.

* cited by examiner

QUANTUM REPEATER

BACKGROUND

Distributed quantum information protocols and networks require the ability to transfer quantum information between remote locations. Such distributed systems generally use photons that can be transmitted through fibers or other media to convey quantum information. However, such transmissions generally experience signal loss and quantum state decoherence effects. For example, an optical signal when transmitted 10 km along a typical optical fiber experiences a 1.9 dB loss, so that a single photon may have a 50% probability of being lost. Loss and decoherence effects on duplicated or redundant quantum states can create noisy entangled states that may reliably convey quantum information over limited distances, but transmissions over large distance generally require quantum repeaters. With quantum repeaters, entanglement can be created across a channel extending a large distance by dividing the channel into sufficiently short segments or links such that noisy entangled states in each link can be purified and then connected via entanglement swapping. The distributed quantum system can then use the resulting entanglements between distant nodes, for example, to teleport quantum information or transmit secret classical information.

Some known approaches to quantum repeaters use single photon states for transmissions and generate entanglement using post-selection based on single-photon detection. See, for example, L. M. Duan, M. D. Lukin, J. I. Cirac, and P. Zoller, Nature 414, 413 (2001), L. Childress, J. M. Taylor, A. S. Sørensen, and M. D. Lukin, eprint: quant-ph/0410115 (2005), and L. Childress, J. M. Taylor, A. S. Sørensen, and M. D. Lukin, eprint: quant-ph/0502112 (2005). In these schemes, high-fidelity entanglement is created, and subsequent entanglement concentration is needed primarily to compensate for the degrading effect of connecting the imperfect entangled pairs via swapping. However, due to their low success probabilities in the initial entanglement distribution, these protocols have low communication rates.

BRIEF DESCRIPTION OF THE DRAWINGS

Use of the same reference symbols in different figures indicates similar or identical items.

DETAILED DESCRIPTION

In some of its aspects, the present invention can provide quantum repeaters for creating entanglements of quantum states at stations separated by large distances. A series of such quantum repeaters, for example, can enable processes for establishing quantum entanglements and quantum communication channels over distances exceeding 1000 km. Further, transmissions over optical fibers can be conducted with intense light pulses rather than single photons, and such transmissions can be directly inserted into existing optical networks that were developed for classical communications.

One exemplary quantum repeater is based on hybrid light-matter systems, where light is used for quantum state transfer and matter systems are used for quantum memory. In one particular entanglement process, a bright "probe pulse" interacts with a first matter qubit at one station, is transmitted on an optical network, and then interacts with a second matter qubit at a next station. Sequentially or in parallel, multiple probe pulses can similarly interact with respective pairs of matter qubits, where each pair including one qubit at each of the two stations. Qubit pairs in entangled states can then be identified, i.e., post-selected, based upon the results of measurements of the probe pulses. Despite this post-selection, high success probabilities can still be achieved, thus providing a significant advantage over known protocols that require single-photon detection. Effects such as photon loss from the probe pulses will cause each of the selected qubit pairs to be in a state that is not a pure entangled state, but direct concentration of the entanglement from several noisy entangled states can produce one or more entangled photon pairs in a high-fidelity entangled state. Entangled qubit pairs can be similarly created at each pair of neighboring stations in a communication channel, and entanglement swapping techniques as described further below can transfer entanglements to entangle qubits at the end stations of the communication channel.

Figure 1A:
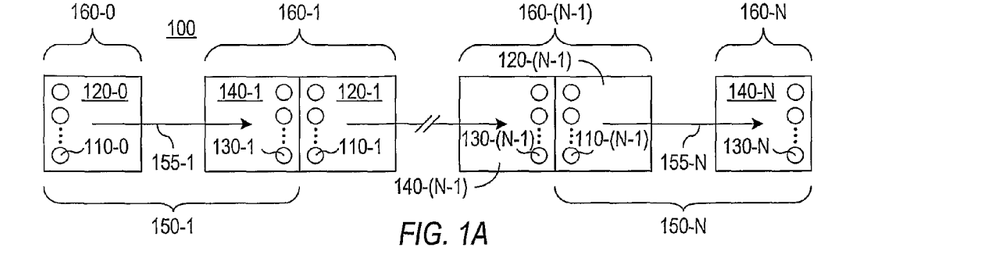
FIG. 1A shows a chain of links and quantum repeaters in accordance with an embodiment of the invention capable of entangling quantum states at remote stations.

FIG. 1A illustrates an extended quantum communication channel 100, which may form a portion of a more complex communication network. Channel 100 contains of a series of N communication links 150-1 to 150-N, generically referred to herein as communication links 150. An exemplary embodiment of a communication link 150 is illustrated in more detail in FIG. 1B. Communication links 150-1 to 150-N respectively include photonic channels 155-1 to 155-N that connect respective transmitter portions 120-0 to 120-(N−1) of quantum repeaters or stations 160-0 to 160-(N−1) to respective receiver portions 140-1 to 140-N of quantum repeaters or stations 160-1 to 160-N. Quantum repeaters or stations 160-0 to 160-N are sometimes generically referred to herein as quantum repeaters 160, and FIG. 1C illustrates in greater detail an exemplary embodiment of a quantum repeater 160.

Transmitter portions 120-0 to 120-(N−1), generically referred to herein as transmitter portions 120, include respective sets of matter systems 110-0 to 110-(N−1), and receiver portions 140-1 to 140-N, generically referred to herein as receiver portions 140, include respective sets of matter systems 130-1 to 130-N. Matter systems 110-0 to 110-(N−1) and 130-1 to 130-N, generically referred to herein as matter systems 110 and 130, may be substantially identical and have quantum states suitable for storage of quantum information and interaction with probe pulses. In an exemplary embodiment, each matter system 110 or 130 has a quantum state capable of representing a qubit. As described further below, at least some of the employed states of matter systems 110 and 130 interact with probe pulses that are transmitted between stations 160 via photonic channels 155.

Station 160-0 in FIG. 1A is an end station that only includes a transmitter portion 120-0, and station 160-N is an end station that only includes a receiver portion of repeater 140-N. This configuration is sufficient for processes that entangle the quantum states of matter systems 110-0 in station 160-0 and respective matter systems 130-N in station 160-N using photonic probe signals that propagate in channel 100 in the direction from station 160-0 to 160-N. However, other configurations are possible. For example, receiver and transmitter portions (not shown) may be added to stations 160-0 and 160-N, respectively, and/or specific stations 160 may have two transmitter portions 120 or two receiver portions 140, for example, when light propagates in different directions in different links 150.

A process in accordance with one embodiment of the invention creates high fidelity entanglements between one or more matter systems 110-0 in end station 160-0 and respective matter systems 130-N in end station 160-N. The entangled pairs of matter systems 110-0 and 130-N are then available for quantum information processing tasks such as teleportation of states and gates, distributed quantum computing, quantum key distribution, quantum error correction, and general distributed quantum information processing.

Creating high-fidelity entanglements between remote matter systems 110-0 and 130-N typically involves three processes that are sometime referred to herein as entanglement distribution, entanglement concentration, and entanglement swapping. Entanglement distribution creates entanglements between paired matter systems 110 and 130 on opposite ends of each link 150. As described further below, the entanglement distribution process uses post-selection to determine whether an entangled state was successfully created for a pair of matter systems 110 and 130. Pairs 110 and 130 that were successfully entangled may not be in high-fidelity entangled states. Entanglement concentration improves the entanglement fidelity if necessary, while the entanglement distribution process may again try to entangle other pairs of matter systems 110 and 130.

Entanglement concentration increases the entanglement fidelity and/or the purity of a mixed state by performing local quantum operations and classical communication within a link 150. For example, entanglement concentration can convert m entangled pairs having lower fidelity entanglements into a smaller number n of entangled pairs with higher fidelity entanglements. In general, entanglement concentration can be performed before and/or after entanglement swapping.

Entanglement swapping swaps the entanglements of two entangled pairs of matter systems. More specifically, local operations on matter systems 110 and 130 in the same quantum repeater 160 can create entanglements between remote matter systems 130 and 110 that where initially entangled with the local matter systems 110 and 130. In a multi-step process, entanglement swapping can convert entanglements within links 150, to entanglements extending across multiple links 150, and finally to entanglements between matter systems 110-0 and respective matter system 130-N in the end stations 160-0 and 160-N.

Figure 1B:
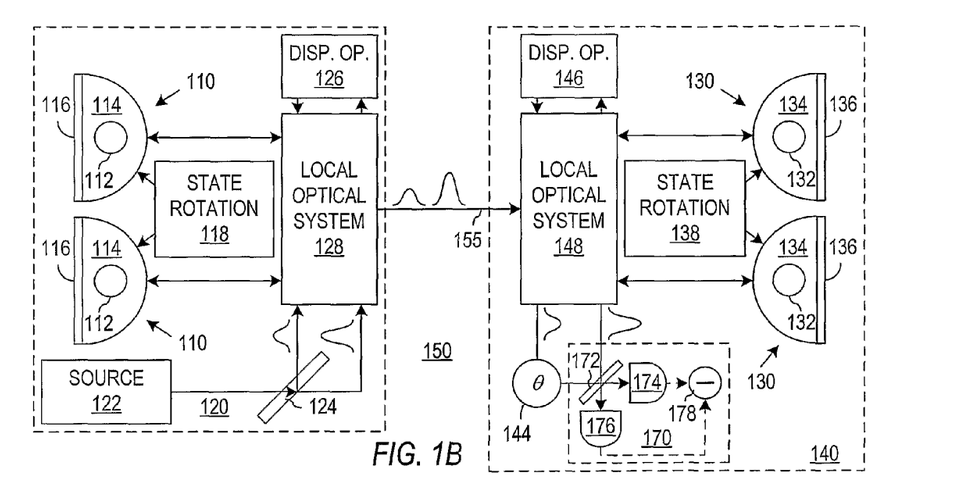
FIG. 1B shows an embodiment of a link suitable for use in the chain of FIG. 1A for entangling quantum states at neighboring stations.
Figure 1C:
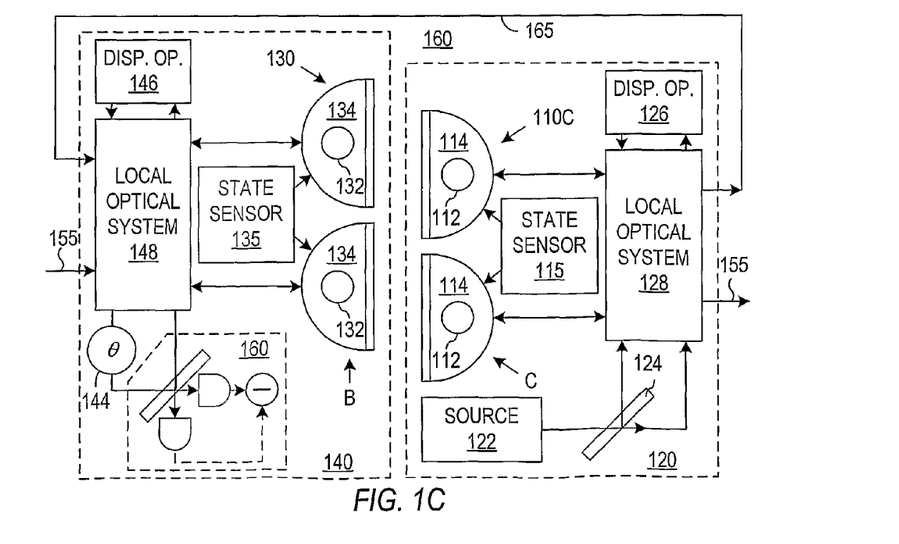
FIG. 1C shows a quantum repeater in accordance with an embodiment of the invention including quantum gates for entanglement swapping.

FIG. 1B illustrates a communication link 150 suitable for use in communication channel 100 of FIG. 1A. Link 150 includes a transmitter portion 120 of one quantum repeater or station 160, a receiver portion 140 of the next quantum repeater or station 160, and a photonic channel 155 linking transmitter portion 120 to receiver portion 140. In general, photonic channel 155 can be any system for conveying a photonic probe pulse without unacceptable signal loss. Suitable systems for photonic channel 155 include but are not limited to a portion of an optical network, an optical fiber, a waveguide, or free space. Channel 155 may additionally include multiple parallel sub-channels, e.g., multiple parallel optical fibers, for parallel transmission of optical signals, i.e., spatial multiplexing, that allow entanglement distribution, entanglement concentration, and/or entanglement swapping operations to be performed in parallel in communication link 150. Time multiplexing can also be employed to increase data rates by performing overlapping operations in quantum repeaters 160, e.g., using the same optical fiber. As a simple and concrete example, the following discusses an implementation in which photonic channel 155 is a single optical fiber.

In the embodiment illustrated in FIG. 1B, transmitter portion 120 includes matter systems 110, a state rotation system 118 capable performing state transformations on matter systems 110, a light source 122 capable of producing a probe pulse, a system 126 capable of performing displacement operations on the probe pulse, and an optical system 128 that manipulates the probe pulse for interaction with system 126 or a matter system 110 and for transmission through channel 155. FIG. 1B shows transmitter portion 120 as including two substantially identical matter systems 110, but more typically transmitter portion 120 may require several matter systems 110 for use in redundant entanglement distribution, concentration, and swapping processes. The number of matter systems 110 in transmitter portion 120 will in general be selected according to the probability of success of an entanglement distribution operation between portions 120 and 130 and the number of entangled pairs desired for entanglement concentration as described further below. Transmitter portion 120 would typically include about 16 matter systems 110 that can independently be entangled with respective matter systems 130 in receiver portion 140.

Each matter system 110 or 130 in an exemplary embodiment of the invention is a system having quantum states $|0\rangle$ and $|1\rangle$ suitable for the basis states of a qubit, and at least one of the basis states $|0\rangle$ or $|1\rangle$ has a coupling to a probe mode produced by source 122. The basis states $|0\rangle$ and $|1\rangle$ may be electronic spin states, for example, of a single electron trapped in a quantum dot, an atom, or by neutral donor impurities in semiconductors. As an illustrative example, the following assumes that each matter system 110 or 130 corresponds to a single electron that is bound in an atom 112 or 132, and basis states $|0\rangle$ and $|1\rangle$ correspond to spin projection Eigen states of the electron.

To improve the strength of the interaction between the electron and the probe pulse, atom 112 or 132 is placed in a cavity 114 or 134 that is approximately resonant with the wavelength of the probe pulse. For cavity 114 or 134, weak coupling is generally sufficient, but a high value of Q/V is preferred, where Q is the quality and V is the mode-volume of cavity 114 or 134. Additionally, each cavity 114 or 134 preferably has a highly reflective portion or feature 116 or 136 that limits the direction of emission of light from the cavity 114 or 134. Ideally, reflective portion 116 or 136 is a perfect mirror that prevents light from escaping from cavity 114 or 134 except along a desired output direction.

Source 122 in the embodiment of transmitter portion 120 shown in FIG. 1B is a light source such as a laser that produces light pulses in a known quantum state. The light pulses generally have a quantum state with measurable characteristics in phase space that can be differentially altered through interactions with the quantum state of a matter system. A pulse here may correspond to a period of light flow that commences and ends when light begins and stops flowing or a period of light flow during a continuous stream. The following concentrates on use of coherent light pulses since lasers normally produce coherent light as the default state. However, the embodiments described below in general may be adapted to use other quantum states such as squeezed states, cat states, NOON states, or states containing components with different photon numbers (i.e., a sum of multiple Fock states).

A beam splitter 124 in the illustrated embodiment splits a light pulse from source 122 to create a probe pulse and a reference pulse. As a concrete example, the following assumes that the probe pulse is a coherent state $|\alpha\rangle$, sometimes referred to herein as probe state $|\alpha\rangle$. Local optical system 128 directs light corresponding to probe state $|\alpha\rangle$ into a selected matter system 110 and outputs light emerging from that matter system 110 on channel 155. A second output mode of beam splitter 124 can also be directed through optical system 128 for transmission on channel 155 and use as a reference signal or local oscillator for a measurement receiver portion 140 performs.

Receiver portion 140 in FIG. 1B includes matter systems 130, a state rotation system 138 for local transformation of matter systems, a system 146 for performing displacement operations on probe pulses, a local optical system or network 148, and a measurement system 170. Matter systems 130 are substantially identical to and in one-to-one correspondence with matter systems 110, and although only two matter systems 130 are shown in FIG. 1B, a more typical embodiment might include several matter systems 130 in receiver portion 140. Optical system 148 in receiver portion 140 directs the probe pulse from channel 155 into a selectable matter system 130 and from that matter system 130 into measurement system 170. Optical system 148 can also direct a reference pulse received via channel 155 to measurement system 170 without interaction with any of the matter systems 130. In an entanglement distribution process as described below, measurement system 170 measures the probe pulse after the probe pulse sequentially interacts with corresponding matter systems 110 and 130, and the result of the measurement indicates whether those two matter systems 110 and 130 are in a quantum state having a component providing the desired entanglement.

An exemplary entanglement distribution process between transmitter portion 120 and receiver portion 140 begins with preparing matter systems 110 and 130 in initial states. For example, each matter system 110 or 130 can be initially prepared in a state $$\frac{1}{\sqrt{2}}(|0\rangle + |1\rangle).$$

Each matter system 110 or 130 in the exemplary embodiment is an electron spin system or atom in a cavity and provides a Λ-system with stable or metastable states $|0\rangle$ and $|1\rangle$. A state rotation system 118 or 138 can induce transitions between states $|0\rangle$ and $|1\rangle$, e.g., via stimulated adiabatic Raman transitions or spin resonance techniques, if necessary to produce the desired initial states of matter systems 110 and 130.

In general, each matter system 110 or 130 interacts with the probe state in a manner that depends on the state of the matter system 110 or 130. One example of a suitable interaction occurs when only one of states $|0\rangle$ and $|1\rangle$ interacts with the probe state $|\alpha\rangle$. Alternatively, both states $|0\rangle$ and $|1\rangle$ may interact with probe state $|\alpha\rangle$ but cause changes having different magnitudes or directions/

Figure 2:
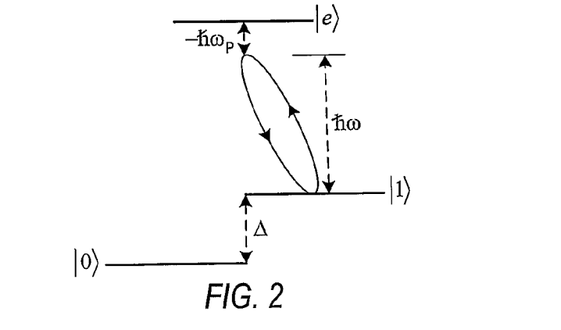
FIG. 2 is an energy level diagram illustrating the energy levels of a matter system suitable for implementing a qubit in a quantum repeater.

FIG. 2 is an energy level diagram illustrating relationships of the energy $\hbar\omega$ per photon in probe state $|\alpha\rangle$, qubit basis states $|0\rangle$ and $|1\rangle$, and an excited state $|e\rangle$ of a matter system 110 or 130 for an example in which only state $|1\rangle$ interacts with the probe state $|\alpha\rangle$. For an ideal case of this example, the photonic probe is completely ineffective at inducing transitions between qubit state $|0\rangle$ and excited state $|e\rangle$ because the $|0\rangle$-to-$|e\rangle$ transition energy differs greatly from photon energy $\hbar\omega$, because of a prohibitive selection rule, or because of some combination of the two. An energy difference Δ between states $|0\rangle$ and $|1\rangle$ as illustrated in FIG. 2 may be positive, negative, or not required if the matter system is subject to a selection rule that prohibits a direct transition between qubit state $|0\rangle$ and excited state $|e\rangle$. Photons in probe state $|\alpha\rangle$ interact with qubit state $|1\rangle$, but the single photon energy $\hbar\omega$ is preferably detuned from the transition between qubit state $|1\rangle$ and excited state $|e\rangle$ by and amount $\hbar\omega_p$ that is sufficient to provide a dispersive light-matter interaction. The dispersive interaction light-matter interaction can be modeled by an evolution operator $\hat{U}$ of Equation 1, where Ω is a coupling constant and at and $a^\dagger$ are respectively the creation and annihilation operators for photons of the frequency used in the probe. The finite probability for spontaneous emission from the matter system 110 or 130 and for light to leak from the cavity 114 or 134 adds a small correction to channel losses. For simplicity of explanation, the following discussion of the entanglement distribution will initially ignore this loss.

$$\hat{U} = e^{-i\hat{H}t/\hbar} \text{ where } \hat{H} = \hbar\Omega a^\dagger a |1\rangle\langle 1| \qquad \text{Equation 1}$$

One example implementation of a matter system 110 or 130 providing the energy level relations of FIG. 2 is a semiconductor donor-bound impurity, where qubit states $|0\rangle$ and $|1\rangle$ are provided by electron Zeeman sublevels induced by an external magnetic field and the excited state is provided by the lowest bound-excited state. Other examples include the hyperfine structure of atoms, trapped ions, or quantum dots. Some more specific examples of suitable cavity-matter system implementations of systems 110 and 130 include optically bright donor-bound impurities such as $^{19}$F:ZnSe with a moderate-Q micro-cavity, the optically dim $^{31}$P:Si system with a high-Q microcavity, and trapped ions in large but very high-Q cavities. Herein, a matter system 110 or 130 implementing a qubit is sometimes referred to as an atom although the matter system may be a semiconductor impurity or quantum dot containing many atoms.

Source 122 and beam splitter 124 in transmitter portion 120 of FIG. 1B as described above produce a coherent light pulse corresponding to probe state $|\alpha\rangle$ that is directed through optical system 128. From optical system 128, probe state $|\alpha\rangle$ enters cavity 114 and interacts with atom 112 while being reflected back through and out of cavity 114. The dispersive light-matter interaction of probe state $|\alpha\rangle$ with state $|1\rangle$ introduces a phase shift, but state $|0\rangle$ does not interact with probe state $|\alpha\rangle$. As a result, the total output state of matter system 110 and the probe mode may be described by Equation 2. In Equation 2, $\hat{U}_1$ represents the evolution operator for the interaction of probe state $|\alpha\rangle$ with a first matter system, and $\theta$ corresponds to the phase shift cause by the interaction of probe state $|\alpha\rangle$ with state $|1\rangle$ of atom 112 in cavity 114, i.e., $\theta=\Omega t$. For semiconductor impurities and realistic cavity parameters, phase shifts $\theta$ on the order of $10^{-5}$ to $10^{-1}$ radian can be achieved.

$$\hat{U}_1[(|0\rangle+|1\rangle)|\alpha\rangle]/\sqrt{2}=(|0\rangle|\alpha\rangle+|1\rangle|\alpha e^{-i\theta}\rangle)/\sqrt{1} \quad \text{Equation 2}$$

After interacting with matter system 110, light from the probe pulse traverses channel 155 to receiver portion 140. Optical system 128 also transmits the reference pulse but at a different time, so that optical system 148 in receiver portion 140 can distinguish a probe pulse and a reference pulse. Optical system 148 directs the light from the probe pulse into a matter system 130 where the light interacts with only state $|1\rangle$ of that matter system 130. The probe pulse then returns through system 148 and passes through a phase gate that imparts a fixed phase change $-\theta$ to the probe pulse. The phase constant $-\theta$ of phase gate in one embodiment is approximately equal to the negative of the phase shift resulting from the probe pulse interacting with state $|1\rangle$. Neglecting photon loss, the total state including matter systems 110 and 130 and the probe pulse is given in Equation 3. In Equation 3, $\hat{U}_2$ is the evolution operator for the probe pulse interaction with a second matter system, and $|\psi^+\rangle$ is a desired entangled state $$\frac{1}{\sqrt{2}}(|01\rangle+|10\rangle)$$

of matter systems 110 and 130.

$$\hat{U}_2[(|0\rangle_1|\alpha\rangle+|1\rangle_1|\alpha e^{-i\theta}\rangle)(|0\rangle_2+|1\rangle_2)/2] = \quad \text{Equation 3}$$
$$\frac{1}{\sqrt{2}}|\psi^+\rangle|\alpha\rangle+\frac{1}{2}|00\rangle|\alpha e^{i\theta}\rangle+\frac{1}{2}|11\rangle|\alpha e^{-i\theta}\rangle$$

A probe state measurement having a result that depends on phase shift $\theta$ is capable of distinguishing the term corresponding to entangled state $|\psi^+\rangle$ from the other two terms and when successful, can effectively project a pair of matter systems 110 and 130 onto an entangled state. For example, a measurement discriminating a zero-phase shift in the probe state from a $\pm\theta$ phase shift for the probe can successfully project matter systems 110 and 130 onto an entangled state about 50% of the time, i.e., when the measurement result indicates a zero phase shift.

In the event that matter systems 110 and 130 cause different phase shifts $\theta_1$ and $\theta_2$, displacement system 126 or 146 can shift the phase of the probe state by $\theta_2-\theta_1$, so that the $|01\rangle$ and $|10\rangle$ components of state $|\psi^+\rangle$ will have the same total phase shift (e.g., 0) after the probe pulse interacts with matter system 130. This will shift the phase of the terms of in Equation 3, but still permits a measurement to distinguish the desired state $|\psi^+\rangle$.

One measurement technique applies a displacement $-\alpha$ to the probe state, e.g., interferes the probe state with a reference state $|-\alpha\rangle$, and then measures the number of photons in the resulting state. Such a displacement or interference can be implemented in system 146, for example, by interfering light from the probe state and light from a local oscillator through a beam splitter, e.g., using a powerful local oscillator and a high reflectivity beam splitter. The displacement operation transforms the state of Equation 3 to $$\frac{1}{\sqrt{2}}|\psi^+\rangle|0\rangle+\frac{1}{2}|00\rangle|(e^{i\theta}-1)\alpha\rangle+\frac{1}{2}|11\rangle|(e^{i\theta}-1)\alpha\rangle,$$

so that the desired term has photon number zero. Accordingly, a detector capable of distinguishing no photons from some photons can identify successful production of an entangled state.

Figure 3:
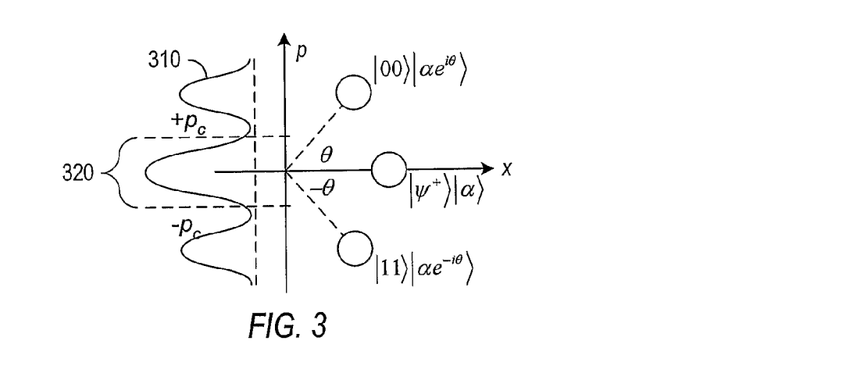
FIG. 3 is a phase space diagram illustrating techniques for post-selection of entangled matter systems.

A measurement of the position or momentum quadrature also provides information that can indicate when the matter systems are in the desired entangled state $|\psi^+\rangle$. FIG. 3 shows a phase space distribution of the three terms on the left hand side of Equation 3. Using, for convenience, the convention that amplitude $\alpha$ is real, axes x and p are respectively along the real and imaginary axes of phase space. As is well known, the amplitudes of coherent states spread equally in both the x and p directions of phase space. Since the desired term is separated from the other terms both in the real and imaginary directions, a measurement p of the momentum quadrature or a measurement x of the position quadrature can distinguish the desired term. However, for small $\theta$, the separation of the terms in the imaginary direction is proportional to phase shift $\theta$, while the separation in the real direction is proportional to $\theta^2$. A momentum quadrature measurement should thus better distinguish the desired state in a typical application where phase shift $\theta$ is between $10^{-5}$ and $10^{-1}$ radians.

FIG. 1B illustrates an embodiment of receiver portion 140 including a measurement system 170 capable of performing a homodyne measurement of the momentum quadrature of the probe pulse. In the illustrated embodiment, measurement system 170 includes a 50-50 beam splitter 172, photon detectors 174 and 176, and processing electronics 178. In operation, local optical system 148 directs light from the probe pulse and light from the reference signal to separate input ports of beam splitter 172. The probe and reference signals reach measurement system 170 at substantially the same time, but variation in the optical path length can be adjusted to introduce a desired phase $\phi$ between the probe and the reference signal at beam splitter 172. Photon detectors 174 and 176 with processing electronics 178 measure the difference between the numbers of photons from respective output ports of beam splitter 172. As known in the art, with proper selection of beam splitter 170 and phase $\phi$, e.g., $\phi=\pi/2$, measurement electronics 178 produces a measurement p of the momentum quadrature.

A conditional state $|\psi^C(p)\rangle$ of the matter systems for a measured value p can be written as indicated in Equation 4. In Equation 4, function $C_S(p)$ is defined to be $G_S(p)K_S(p)$ for $s=0, \pm1$, with $$G_S(p) = \left(\frac{2}{\pi}\right)^{\frac{1}{4}} \exp[-(p-sd)^2],$$

$K_0 = e^{-2\alpha p}$, and $K_r(p) = e^{-i\alpha \cos \theta(2p-rd)}$ for $r=\pm1$. Parameter d is referred to herein as the distinguishability and is defined to be $\alpha \sin \theta$. The desired entangled state $|\psi^+\rangle$ will have been created (at least approximately) when a measurement p is such that $C_1(p)$ and $C_{-1}(p)$ are small relative to $C_0(p)$. A plot 310 in FIG. 3 represents the relative probabilities for measurements p and particularly illustrates peak probabilities at 0 and $\pm d$, which correspond to the peaks of functions $G_0(p)$ and $G_{\pm 1}(p)$.

$$|\psi^C(p)\rangle = \frac{C_0(p)}{\sqrt{2}}|\psi^+\rangle + \frac{C_1(p)}{2}|00\rangle + \frac{C_{-1}(p)}{2}|11\rangle \quad \text{Equation 4}$$

The ability to distinguish the desired entangled state $|\psi^+\rangle$ from the two unwanted terms of Equation 4 depends on the distance between the corresponding Gaussian peaks of functions $G_S(p)$ and therefore on the distinguishability d. The maximally entangled state $|\psi^+\rangle$ is post-selected by selecting a pair of matter systems 110 and 130 only when the measurement p is within a finite window around zero, i.e., around the peak of function $G_0(p)$. In FIG. 3, a selection window 320 is defined to contain momentum quadrature measurements p having an absolute value less than a parameter $p_c$ where parameter $p_c$ is chosen according to the distinguishability $d=\alpha \sin \theta$. Absent optical losses, a large amplitude a for the probe pulse could be used to provide a large distinguishability and allow a large window parameter $p_c$ that makes the success rate for entanglement approach the theoretical limit of 50% while the coefficients of the unentangled components of state $|\psi^C(p)\rangle$ become small. The window size $p_c$ can be reduced if desired to improve reliability of the identification of maximally entangled states at the expense of decreasing entanglement success probability $P_S$.

Photon loss creates a tradeoff between distinguishability and decoherence effects. Loss of photons caused, for example, by channel 155, leakage from cavities 114 and 134, and spontaneous emissions from atoms 112 and 132 can be modeled by considering a beam splitter having transmission $\eta^2$ in channel 155. The lost photons provide "which-path" information, and tracing over the lost photons introduces decoherence. More specifically, the loss in channel 155 leads to a damping factor $\gamma$ (corresponding to the decrease in amplitude of the probe pulse) and an extra phase shift $\xi$ in the component corresponding to the desired state. The effect of the additional phase shift can be countered by adding a fixed phase shifter or adjusting the phase constant of phase shifter 144, e.g., setting the phase constant to $\theta-\xi$. With this correction, a measurement indicating successful entanglement produces a mixed state of the form $$\frac{(1+e^{-\gamma})}{2}|\psi^+\rangle\langle\psi^+| + \frac{(1+e^{-\gamma})}{2}|\psi^-\rangle\langle\psi^-|.$$

Damping factor $\gamma$ scales roughly as $\gamma \approx 2\eta^2\alpha^2(1-\cos\theta) \approx \eta^2\alpha^2\theta^2$, therefore increasing distinguishability $d=\alpha \sin \theta \approx \alpha\theta$ increases damping $\gamma$ and decreases the fidelity of the entangled state. An optimal value for the product $\alpha\theta$ can be selected to be the value where the increasing decoherence effects associated with the damping factor $\gamma$ outweigh the increasing distinguishability d.

Figure 4:
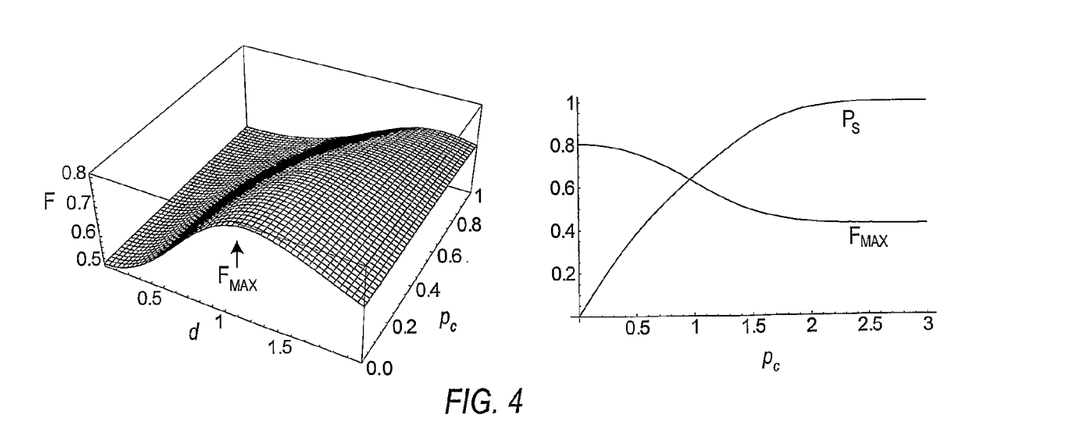
FIG. 4 contains plots of indicating relationships among entanglement fidelity, distinguishability, measurement window size, and entanglement success probability for an entanglement distribution process in accordance with an embodiment of the invention.

Channel loss may come from a variety of sources, including finite mode-coupling efficiency, but is likely to be dominated by fiber loss. Assuming telecom fiber and wavelength and individual links 155 that are about 10 km. in length, intensity losses are about 0.17 dB/km, and the transmission parameter for a 10-km link is $\eta^2 = \frac{2}{3}$. FIG. 4 shows theoretical plots of the fidelity F of the selected entangled states as a function of the window parameter $p_c$ and distinguishability $d=\alpha \sin \theta$ for a transmission of $\eta^2 = \frac{2}{3}$ and a phase shift $\theta=0.01$. Due to the trade-off between distinguishability and decoherence, there is an optimal distinguishability d yielding a maximum fidelity $F_{MAX}$ for each value of window size parameter $p_c$. The overall maximum fidelity $F_{MAX}$ of about 0.8 in FIG. 4 is for small window size $p_c$ and therefore can be achieved only at the expense of a vanishing success probability $P_S$. However, a reasonable success probability of $P_S$ of about 36% is achieved for a post-selection window size $p_c$ of about 0.5, and with that window size $p_c$, the maximum entanglement fidelity $F_{MAX}$ is about 0.77. This high rate of successful entanglement generation is in sharp contrast to the low efficiencies of single-photon-based approaches. The above values for maximum fidelity $F_{MAX}$ and success probability $P_S$ correspond to a distinguishability d of about 1, which for phase shifts of $\theta$ of about 0.01 radians, is achievable with a reasonable probe amplitude $\alpha$ of about 3600.

The entanglement distribution process described above employs light-matter interactions that can be described by an evolution operator $\hat{U} = \exp[i\theta a^\dagger a|1\rangle\langle 1|]$. However, matter systems that provide an evolution operator of the form indicated in Equation 5 could similarly be used. In Equation 5, $\Omega'$ is a coupling constant, and t is the interaction time, and $a^\dagger$ and a are the creation and annihilation operators for photons used in the probe. States $|0\rangle$ and $|1\rangle$ are states of the matter system, but in this embodiment, both states $|0\rangle$ and $|1\rangle$ interact with the probe photons. Such an interaction results from the Jaynes-Cumming interaction in the dispersive regime. Examples of physical systems capable of producing the interaction corresponding to Equation 5 include cavity QED systems including quantum dots. It should also be noted that addition of an appropriate fixed phase shifter to a system providing the interaction of Equation 1 transforms the interaction to the form of Equation 5 and visa versa.

$$\hat{U}' = \exp\{i\Omega' t a^\dagger a(|0\rangle\langle 0| - |1\rangle\langle 1|)\} = \exp\{i\theta' a^\dagger a \sigma_z\} \quad \text{Equation 5}$$

Matter systems 110 and 130 that provide the evolution operator $\hat{U}'$ can be employed in channel 100 of FIG. 1A, link 150 of FIG. 1B, and quantum repeater 160 of FIG. 1C. Equation 6 shows the effect of interactions of a probe state $|\alpha\rangle$ with matter systems 110 and 130 in respective initial states $$\frac{1}{\sqrt{2}}(|0\rangle_1 + |1\rangle_1)$$

and $$\frac{1}{\sqrt{2}}(|0\rangle_2 + |1\rangle_2)$$

when an entanglement distribution process uses matter-light interactions corresponding to Equation 5. The resulting state is the same as Equation 3 above if θ is equal to 2θ'. Accordingly, the entanglement distribution process using the interaction of Equation 5 can proceed identically as described above except for the change of the phase shift.

$$\hat{U}'_2 \hat{U}'_1 \left[ \frac{1}{\sqrt{2}}(|0\rangle_1 + |1\rangle_1) \frac{1}{\sqrt{2}}(|0\rangle_2 + |1\rangle_2)|\alpha\rangle \right] = \quad \text{Equation 6}$$

$$\frac{1}{\sqrt{2}}|\psi^+\rangle|\alpha\rangle + \frac{1}{2}|00\rangle|\alpha e^{i2\theta'}\rangle + \frac{1}{2}|11\rangle|\alpha e^{-i2\theta'}\rangle$$

Figure 5A:
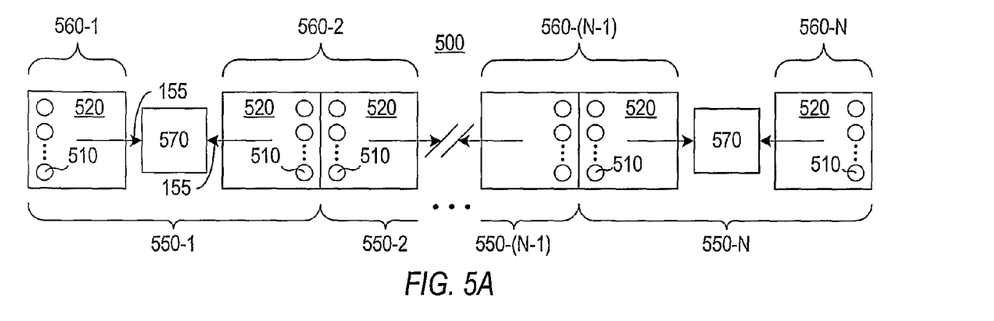
FIG. 5A shows a chain of links and quantum repeaters in accordance with an embodiment of the invention using two probe beams per link.

FIG. 5A illustrates a channel 500 suitable for an alternative entanglement distribution process using two probes per links 550-1 to 550-N. Each of links 550-1 to 550-N include two transmitter portions 520 at opposite ends of the link and two photonic channels 155 connecting the transmitter portions 520 to a measurement station 570. Each transmitter portion 520 includes a set of matter systems 510 that can be substantially identical to matter systems 110 and 130 described above and that preferably provide matter-light interactions corresponding to the evolution operator Û or Û' of Equation 1 or 5.

Figure 5B:
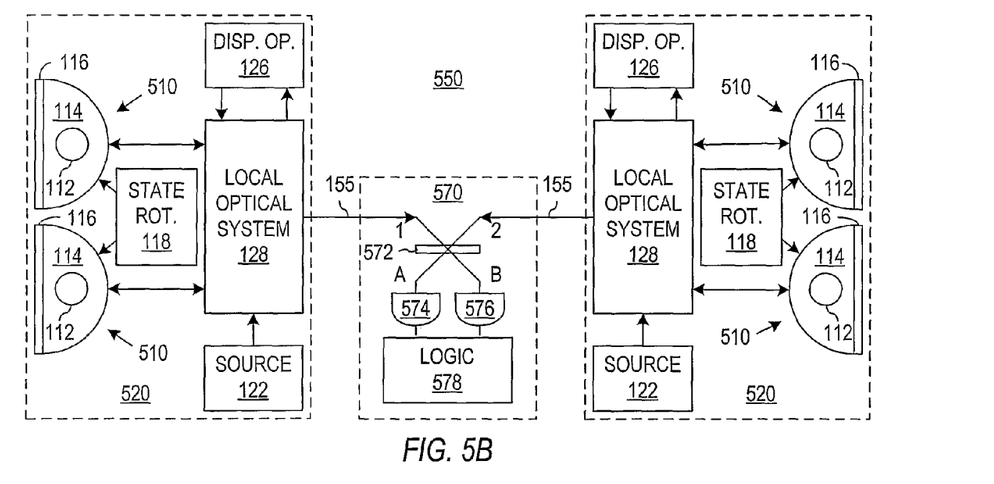
FIG. 5B shows an embodiment of a link suitable for use in the chain of FIG. 5A for entangling quantum states at neighboring stations.

FIG. 5B illustrates in greater detail a generic link 550 suitable for use in channel 500 of FIG. 5A. Each transmitter portion 520 in FIG. 5B includes: matter systems 510, a state rotation system 118 capable of performing local transformations of the state of each matter system 510, a source 122 of a first coherent probe pulse $|\alpha\rangle$, a system 126 for performing displacement operations on the probe pulse, and a local optical system or network 128 capable of routing the probe pulse for interaction with a matter system 510 or displacement system 126 or for transmission on a corresponding photonic channel 155.

An entanglement distribution operation across link 550 of FIG. 5B begins by preparing corresponding matter systems 510 in each transmitter portion 520 of link 550 in respective initial states, e.g., $$\frac{1}{\sqrt{2}}(|0\rangle_1 + |1\rangle_1) \text{ and } \frac{1}{\sqrt{2}}(|0\rangle_2 + |1\rangle_2).$$

Sources 122 create probe pulses, e.g., coherent probe states $|\alpha\rangle_1$ and $|\alpha\rangle_2$, that optical systems 128 direct into respective matter systems 510. To provide an example, the following description assumes a light-matter interaction of a type corresponding to Equation 5, but other types of light-matter interactions could also be employed. After the light-matter interactions, optical systems 128 transmit respective probe pulses to measurement station 570. Equation 7 indicates the state of the matter systems 510 and probe pulses before entering measurement station 570.

$$\hat{U}'_1 \left[ \frac{1}{\sqrt{2}}(|0\rangle_1 + |1\rangle_1)|\alpha\rangle_1 \right] \hat{U}'_2 \left[ \frac{1}{\sqrt{2}}(|0\rangle_2 + |1\rangle_2)|\alpha\rangle_2 \right] = \quad \text{Equation 7}$$

$$|00\rangle|\alpha e^{i\theta'}\rangle|\alpha e^{i\theta'}\rangle + |01\rangle|\alpha e^{i\theta'}\rangle|\alpha e^{-i\theta'}\rangle +$$

$$|10\rangle|\alpha e^{-i\theta'}\rangle|\alpha e^{i\theta'}\rangle + |11\rangle|\alpha e^{-i\theta'}\rangle|\alpha e^{-i\theta'}\rangle$$

Measurement station 570 contains a 50-50 beam splitter 572, measurement systems 574 and 576, and logic 578. Light from the probes are applied to input ports 1 and 2 of beam splitter 572 and light emerge from output ports A and B.

Equation 8 shows the state of the pair of matter systems 510 and the light emerging from beam splitter 510.

$$\xrightarrow{BS} \quad \text{Equation 8}$$

$$|00\rangle|\sqrt{2}\alpha e^{i\theta'}\rangle_A|0\rangle_B + |11\rangle|\sqrt{2}\alpha e^{-i\theta'}\rangle_A|0\rangle_B +$$

$$|01\rangle|\sqrt{2}\alpha\cos\theta'\rangle_A|i\sqrt{2}\alpha\sin\theta'\rangle_B +$$

$$|10\rangle|\sqrt{2}\alpha\cos\theta'\rangle_A|-i\sqrt{2}\alpha\sin\theta'\rangle_B$$

Measurement systems 574 and 576 can measure the light from respective ports A and B of beam splitter 578, and the measurement results will indicate the resulting state of matter systems 510. For example, measurement systems 574 and 576 can perform homodyne measurements of the momentum or position quadrature of state of the light emerging from respective ports A and B. More particularly, a homodyne measurement of the momentum quadrature of the state of light from port B can distinguish the first two terms of Equation 8 from the second two terms. A homodyne measurement of the state of light from port A can then be used to disentangle the state of the matter systems from the probe states.

Logic 578 analyzes the measurement results to determine the state of the matter systems 510, and then sends a classical communication to one or both transmitter stations 520 to indicate whether the matter systems 510 are in a desired entangled state or to instruction one or both state rotation systems 118 to perform one or more local operation as necessary to produce the desired state. In one exemplary process, if a measurement of the momentum quadrature of the light from port A is about 0, the state of the system is approximately known to be $|01\rangle|i\sqrt{2}\alpha \sin \theta'\rangle_V + |10\rangle|-i\sqrt{2}\alpha \sin \theta\rangle_B$, and it can be shown that a position quadrature measurement of the light from port B then converts the matter system state to $e^{i\phi(x)}|01\rangle + e^{-i\phi(x)}|10\rangle$, where φ(x) is a function of the position quadrature measurement x. In this case, measurement station 570 instructs one rotation systems 118 to perform a single qubit rotation by ±2φ(x) of a basis state, e.g., $|1\rangle_1 \rightarrow e^{i2\phi(x)}|1\rangle_1$, to produce the desired Bell state $|\psi^+\rangle$. Alternatively, if a measurement of the momentum quadrature of the light from port B is about 0, the state of the system is approximately know to be $|00\rangle|\sqrt{2}\alpha e^{i\theta'}\rangle_A + |11\rangle|\sqrt{2}\alpha e^{-i\theta'}\rangle_A$, and it can be shown that a position quadrature measurement converts the matter system state to $e^{i\phi(x)}|00\rangle + e^{Li\phi(x)}|11\rangle$, where φ(x) is a function of the position quadrature measurement x. In this case, measurement station 570 instructs one state rotation system 118 to perform a bit-flip on one matter system 510 and a rotation of one basis state by ±2φ(x).

The entanglement distribution implemented using two probe beams as described in regard to FIGS. 5A and 5B has the advantage of allowing greater distance between quantum repeaters 560. For example, each probe pulse in a link 550 experiences attenuation associated with traveling about one half of the distance between stations 560, but each probe pulse in channel 100 of FIG. 1A experiences attenuation associated with traveling the entire distance between stations 160. It can be shown that distance between stations 560 can be more than 50% greater than the maximum distance permitted between stations 160. However, this increase in separation comes at the cost of requiring state correction, e.g., a phase shift, to produces the desired entangled state and the requirement of adding measurement stations 570 halfway between stations 560.

Successful selection of matter system pairs using the above entanglement distribution processes can produce an entangled state with a fidelity that may not be sufficient for entanglement swapping. In particular, after N entanglement swapping operations performed on states with entanglement fidelity f, the resulting fidelity is on the order of $f^N$, which falls to zero, i.e., no entanglement, quickly for a fidelity of about 0.77. Entanglement concentration can increase the fidelity of entanglements of some matter system pairs at the expense of measurements that destroy the entanglements of other matter system pairs. Entanglement concentration may include one or both of entanglement distillation, which increases the entanglement of a state, and entanglement purification, which increases the purity of a mixed state. In general, the entanglement concentration can be performed using known process such as described by Michael A. Nielsen and Isaac L. Chuang, "Quantum Computation and Quantum Information," Cambridge University Press, pp. 578-580, (2000); D. Deutsch, A. Ekert, R. Jozsa, C. Macchiavello, S. Popescu, and A. Sanpera, "Quantum Privacy Amplification and the Security of Quantum Cryptography over Noisy Channels," Phys. Rev. Lett. 77, 2818 (1996); or C. H. Bennett, G. Brassard, S. Popescu, B. Schumacher, J. Smolin, and W. K. Wootters, "Purification of Noisy Entanglement and Faithful Teleportation via Noisy Channels," Phys. Rev. Lett. 76, 722 (1996).

Entanglement concentration in general requires that the selected qubit pairs be in states having suitable properties, e.g., having a fidelity greater than one half. As a result of the quantum distribution process described above, each of the matter system pairs selected will be in a mixed state that depends on the operating parameters of the link and on measurement results, but as noted above, the entanglement distribution can provide sufficient entanglement fidelity, e.g., about 0.77, for concentration.

Figure 6:
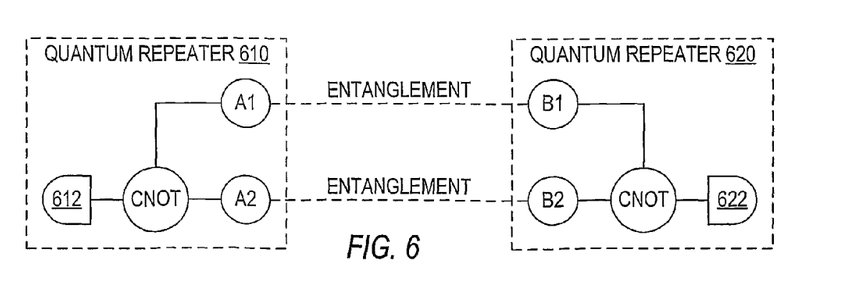
FIG. 6 schematically illustrates an entanglement concentration operation.

FIG. 6 schematically illustrates one example of an entanglement concentration operation. For this entanglement concentration operation, an entanglement distribution process such as one of those described above initially entangles a qubit A1 in a quantum repeater 610 with a corresponding qubit B1 in a quantum repeater 620 and entangles a qubit A2 in quantum repeater 610 with a corresponding qubit B2 in quantum repeater 620. Using the techniques described by Bennet et al., application of random bilateral rotations to the qubit pairs A1-B1 and A2-B2 can transform the state of each pair to a Werner state, which is one form suitable for entanglement concentration. Equation 9 shows the form of a Werner state, where f is the fidelity $\langle\psi^+|M|\psi^+\rangle$, and $|\psi^\pm\rangle=(|01\rangle\pm|10\rangle)/\sqrt{2}$ and $|\phi^\pm\rangle=(|00\rangle\pm|11\rangle)/\sqrt{2}$ are Bell states.

$$W_F = f|\psi^+\rangle\langle\psi^+| + \frac{1-f}{3}(|\psi^-\rangle\langle\psi^-| + |\phi^+\rangle\langle\phi^+| + |\phi^-\rangle\langle\phi^-|) \quad \text{Equation 9}$$

With each of the selected pairs A1-B1 and A2-B2 in a Werner state, a bilateral CNOT operation is performed in which the state of one pair A1-B1 controls performance a NOT operation on the other pair A2-B2 as shown in FIG. 6. Measurement systems 612 and 622 in respective stations or quantum repeaters 610 and 620 perform projective measurements in the computational bases on the target qubits A2 and B2 of the CNOT operations, and the measurement results indicate whether an increase in the entanglement fidelity of the state of control qubits A1-B1 has been achieved. In particular, fidelity increases if the initial fidelity f is greater than 0.5, and the measurements detect state $|00\rangle_2$ or $|11\rangle_2$.

Entanglement concentration can also be performed using the same basic process of FIG. 6 without transforming to Werner states. An entanglement distribution process described above produces mixed state $\rho_{12}$ having the general form of Equation 10A, where Bell states $|\psi^\pm\rangle$ and $|\phi^\pm\rangle$ are defined above. A local transformation can be performed to swap states $|\psi^-\rangle\langle\psi^-|$ and $|\phi^-\rangle\langle\phi^-|$ or $|\phi^+\rangle\langle\phi^+|$, so that the coefficients A, B, C, and D in Equation 10A are such that C>D>A and B. With states of this form for each qubit pair A1-B1 or A2-B2 of FIG. 6, a bilateral CNOT operation is performed, and measurement systems 612 and 622 perform projective measurements of respective qubits A2 and B2 onto the computational basis $|0\rangle$ and $|1\rangle$. If the measurement result from measurement system 612 is the same as the measurement results from measurement system 622, i.e., state $|00\rangle_2$ or $|11\rangle_2$ is detected, the control qubit pair A1-B1 will be in the state $\rho_{12}'$ shown in Equation 10B, where $N=(A+B)^2+(C+D)^2$. The state $\rho_{12}'$ has higher fidelity than the initial state $\rho_{12}$ because $$\frac{C^2+D^2}{N} > C$$

causing the desired entangled state $|\psi^+\rangle\langle\psi^+|$ to be more of state $\rho_{12}'$.

$$\rho_{12} = A|\phi^+\rangle\langle\phi^+| + B|\psi^-\rangle\langle\psi^-| + C|\psi^+\rangle\langle\psi^+| + D|\phi^-\rangle\langle\phi^-| \quad \text{Equation 10A}$$

$$\rho_{12}' = \frac{A^2+B^2}{N}|\phi^+\rangle\langle\phi^+| + \frac{2CD}{N}|\psi^-\rangle\langle\psi^-| + \frac{C^2+D^2}{N}|\psi^+\rangle\langle\psi^+| + \frac{2AB}{N}|\phi^-\rangle\langle\phi^-| \quad \text{Equation 10B}$$

Equation 10B corresponds to a case where both pairs A1-B1 and A2-B2 are initially in states having the form of Equation 10A and identical coefficients A, B, C, and D. However, it can be shown that entanglement concentration still results when qubit pair A1-B1 are in a state of the form of Equation 10A but with coefficients $A_1$, $B_1$, $C_1$, and $D_1$ and qubit pair A2-B2 are in a state of the form of Equation 10A but with different coefficients $A_2$, $B_2$, $C_2$, and $D_2$.

Similar entanglement concentration operations can be performed using parity gates or other quantum gates in place of the CNOT gates of FIG. 6.

Figure 7A:
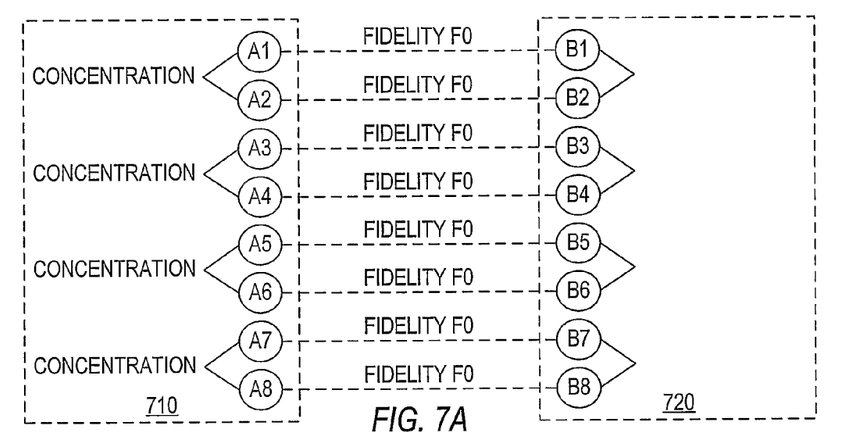
FIGS. 7A, 7B, and 7C illustrate intermediate configurations of qubits at opposite ends of a link during a multi-step entanglement concentration operation in accordance with an embodiment of the invention.

Entanglement concentration can be performed in a multiple step process that incrementally increases the entanglement fidelity of one or more pair of qubits. FIG. 7A illustrates a system in which a quantum repeater 710 contains eight qubits A1 to A8 that respectively correspond to eight qubits B1 to B8 in another quantum repeater 720. An entanglement distribution processes such as described above can be applied to each qubit pair A1-B1 to A8-B8 to create initial states with an initial entanglement fidelity F0 characteristic of the entanglement distribution process. In general, each quantum repeater 710 and 720 may contain more than eight qubits, and the eight qubit pairs depicted in FIG. 7A represent eight pairs for which the entanglement distribution was successful.

A multi-step entanglement concentration process can start by performing parallel entanglement concentration operations on sets of two entangled pairs. For example, using an entanglement distribution operation of a type illustrated by FIG. 6, odd-numbered qubit pairs A1-B1, A3-B3, A5-B5, and A7-B7 can control CNOT operations on respective even-numbered pairs A2-B2, A4-B4, A6-B6, and A8-B8, before the odd-numbered qubit pairs are measured. FIG. 7A illustrates four entanglement concentration operations being performed during the first step of an entanglement concentration process.

Figure 7B:
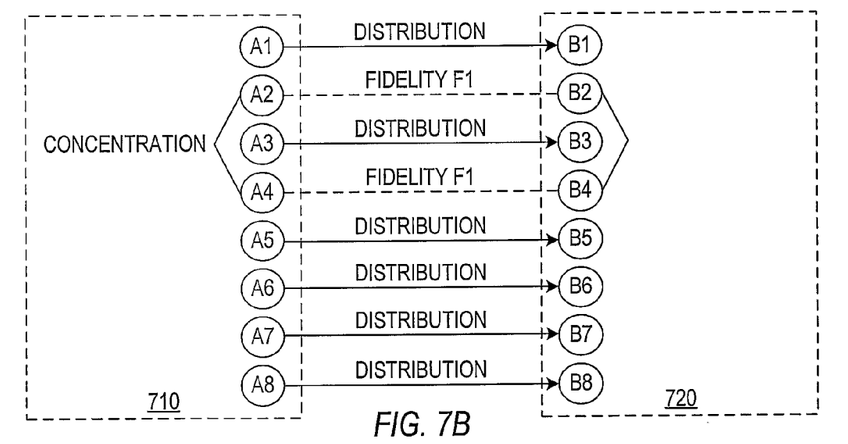

Using above techniques, a fraction of the concentration operations will be successful. FIG. 7B illustrates an example where the first step successfully transform qubit pairs A2-B2 and A4-B4 into states with higher entanglement fidelity F1, while the entanglement concentration operations performed on other qubit pairs failed. A second set of parallel entanglement concentrations operation can then be performed using qubit pairs for which the first concentration operation succeeded, e.g., qubit pairs A2-B2 and A4-B4 in the example of FIG. 7B. Each of the entanglement concentration operations again succeeds a fraction of the time to produce an even higher fidelity entangled state. In the illustrated example, where only two of the first entanglement concentration operations succeed, the second set of entanglement concentration operations includes a single operation that may produce a higher fidelity entanglement of qubit pair A4-B4. However, if the previous steps of entanglement concentration process succeed in producing two or more qubit pairs with higher fidelity entanglement, sets of two qubit pairs can be subject to further entanglement concentration in subsequent steps of the entanglement concentration process.

Entanglement distribution operations can be performed on qubit pairs in parallel with entanglement concentration operations on other qubit pairs. For example, when entanglement distribution initially fails for a qubit pair, an entanglement concentration operation on the qubit pair fails, or the entanglement of the qubit pair is destroyed by a measurement, an entanglement distribution operation can immediately commence for the qubit pair. FIG. 7B illustrates an example in which entanglement distributions is performed on qubit pairs A1-B1, A3-B3, A5-B5, A6-B6, A7-B7, and A8-B8 in parallel or overlapped with the second set of entanglement concentration operations.

Figure 7C:
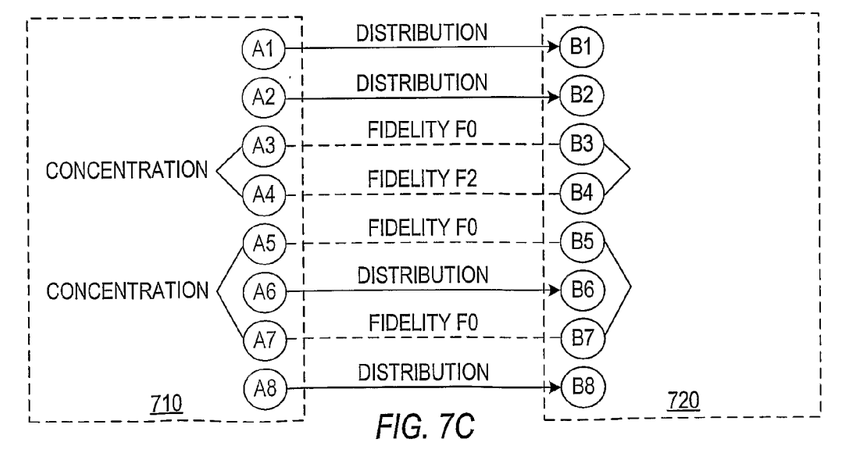

Entanglement concentration operations can also be conducted on states having different entanglement fidelities. FIG. 7C illustrates an example in which the concentration operation from the step illustrated in FIG. 7B successfully produced a state of qubit pair A4-B4 having a higher fidelity F2, and the entanglement distribution operations from the step illustrated in FIG. 7B successfully entangled qubit pairs A3-B4, A5-B5, and A7-B7. In a step corresponding to FIG. 7C, an entanglement concentration operation can then be performed on the two qubit pairs A3-B3 and A4-B4 even though the pairs are in states with different entanglement fidelities. Entanglement concentration operations can simultaneously be performed on other sets of two qubit pairs, e.g., pairs A5-B5 and A7-B7.

The steps illustrated in FIGS. 7A, 7B, and 7C are merely examples of principles that can be employed an entanglement concentration process. Actions taken at each step will in general depend on the results from the preceding step and will vary randomly according to the probabilities that entanglement distribution and entanglement concentration operations will succeed. Classical software or firmware can be used to control quantum repeaters to implement the illustrated principles through the number of steps required to produce one or more qubit pairs in states having a desired entanglement fidelity. Once one suitable entangled state is created, the state can be stored using systems having long coherence times, while other suitably entangled states are generated. For example, once electron spin states in a pair of matter systems are in a state with a desired entanglement fidelity, an operation as described further below can swap the electron spin state to nuclear spin states containing the same quantum information but having a longer coherence time.

One frequent difficulty in systems requiring entanglement concentration is the need to implement CNOT operations. In particular, a CNOT operation can be implemented using a control sign gate and Hadamard transformation, but non-linear systems directly providing the large phase shift (i.e., a π-phase shift) for a controlled sign gate can be difficult to implement. In accordance with an aspect of the invention described further below, CNOT or controlled sign operations required for the projections or other entanglement concentration processes can be implemented using the relatively small phase shifts resulting from the interaction of a probe pulse with matter systems such as matter systems 110, 130, or 510 described above.

The entanglement concentration process performed for communication channel 100 of FIG. 1A or communication channel 500 of FIG. 5A produces high fidelity entangled states of matter systems in neighboring quantum repeaters or stations. Entangled swapping operations can be performed locally within the quantum repeaters to create entanglements between distant stations or repeaters. Quantum repeater 160 of FIG. 1C, for example, contains a receiver portion 140 and a transmitter portion 120 containing the elements described above with reference to FIG. 1B, but FIG. 1C additionally illustrates state sensors 115 and 135 and displacement systems 126 and 146, which are used in entanglement swapping as described further below. At the start of the entanglement swapping operation, a first matter system A in a remote repeater or station (not shown) is in an entangled state $|\psi\rangle_{AB}$ with a second matter systems B in receiver portion 140 of quantum repeater 160, and a matter system C in transmitter portion 120 of quantum repeater 160 is in an entangled state $|\psi\rangle_{CD}$ with a matter systems D in another quantum repeater or station (not shown). States $|\psi\rangle_{AB}$ and $|\psi\rangle_{CD}$ may be produced by entanglement distribution with or without entanglement concentration as described above. The goal of the entanglement swapping operation in this example is to produce an entangled state $|\psi\rangle_{AD}$ of the remote matter systems A and D through performance of no more than local operations in quantum repeater 160, classical communications, and local transformation in the remote quantum repeaters or stations. Although not strictly required for the present use, entanglement swapping typically also produces an entangled state of matter systems B and C.

An exemplary entanglement swapping operation includes performing a CNOT operation on qubits corresponding to matter systems B and C in quantum repeater 160, measuring the state of one matter system B or C to distinguish whether the matter system is in state $|0\rangle$ or $|1\rangle$, measuring the other matter system C or B in a diagonal basis to distinguish whether the other matter system is in a state $(|0\rangle+|1\rangle)/\sqrt{2}$ or $(|0\rangle-|1\rangle)/\sqrt{2}$, and local transformations at the remote stations if necessary for state correction. More specifically, Equation 11A illustrates the effect of a CNOT operation on the initial state of local matter systems B and C and remote matter systems A and D when the initially entangled pairs are in the maximally entangled state $|\psi^+\rangle$ given above. The CNOT operation can be performed using the structures of quantum repeater 160 as described further below. State sensor 135 can then measure that state of matter system B (e.g., measure the spin state of active electron in atom 132) thereby producing one of the two states shown in Equation 11B were the particular state produced depends on the measurement result. Equation 11C shows that four different maximally entangled states (Bell states) of matter systems A and D can be produced depending on the results from measuring matter systems B and C in station 160. For this particular example, the desired entangled states $|\psi^+\rangle$ is produced 25% of the time (i.e., for measurements B=1 and C=+). The states corresponding to other measurement results can be discarded or more preferably classical communication can be used to instruct remote stations to perform local operations on matter system A and/or C to produce the desired state $|\psi^+\rangle$.

$$CNOT_{C-B}\left[\frac{1}{\sqrt{2}}\frac{(|0\rangle_A|1\rangle_B+|1\rangle_A|0\rangle_B)\otimes}{\frac{1}{\sqrt{2}}(|0\rangle_C|1\rangle_D+|1\rangle_C|0\rangle_D)}\right]=$$

$$\frac{1}{2}[|0101\rangle+|0010\rangle+|1001\rangle+|1110\rangle]$$

Equation 11A $$B=|0\rangle \rightarrow \frac{1}{\sqrt{2}}[|010\rangle_{ACD}+|101\rangle_{ACD}]$$

$$B=|1\rangle \rightarrow \frac{1}{\sqrt{2}}[|001\rangle_{ACD}+|110\rangle_{ACD}]$$

Equations 11B $$B=|0\rangle, C=\frac{1}{\sqrt{2}}(|0\rangle\pm|1\rangle) \rightarrow \frac{1}{\sqrt{2}}[\pm|00\rangle_{AD}+|11\rangle_{AD}]$$

$$B=|1\rangle, C=\frac{1}{\sqrt{2}}(|0\rangle\pm|1\rangle) \rightarrow \frac{1}{\sqrt{2}}[|01\rangle_{AD}\pm|10\rangle_{AD}]$$

Equations 11C

Matter systems A and D may be in stations that are directly connected to quantum repeater 160 by respective channels 155 or may be many links away from quantum repeater 160. The entanglement distribution process creates entanglements between neighboring stations or repeaters 160, but a series of entanglement swapping operations can increase the distance between entangled matter systems. For example, in FIG. 1A, entanglement swapping operation sequentially performed at quantum repeaters 160-1 to 160-(N−1) can convert the initial entanglements between neighboring quantum repeaters and stations 160 to an entanglement between end stations 160-0 and 160-N. A faster methods for transferring the entanglement to end stations 160-0 and 160-N can perform multiple entanglement swapping operations in parallel, e.g., at every other quantum repeater 160-1 to 160-(N−1) that has not performed a swapping. A variety of other combinations of parallel and sequential entanglement swapping operations can similarly produce entangled states of matter systems 110-0 and 130-N.

For both entanglement concentration and swapping operations, two-qubit gates such as CNOT gates, controlled sign gates, or parity gates are needed. For this purpose, a measurement-free deterministic controlled-sign gate based upon a sequence of rotations in matter systems 110 or 130 and unconditional displacements of a coherent probe state can be implemented in a quantum repeater or station 160. Equation 12 indicates a unitary operator $\hat{U}_{cs}$ for implementation of a controlled sign operation. In Equation 12, operators $\hat{U}_1$ and $\hat{U}_2$ corresponds to the interaction evolution operators of Equations 1, 2, and 3 above. The operator $\hat{D}(\beta) \equiv \exp(\beta\hat{a}^\dagger - \beta^*\hat{a})$ describes a phase-space displacement of the probe state by $\beta$, and in Equation 12, $\beta \equiv \alpha(1-i)$.

$$\hat{U}_{cs}=\hat{U}_2(\theta)\hat{D}(\beta)\hat{U}_1(\theta)\hat{D}(-\beta^*)\hat{U}_2(\theta)\hat{D}(-\beta)\hat{U}_1(\theta)$$

Equation 12

An entanglement concentration operation in link 150 of FIG. 1B would generally include performing the operation of Equation 12 on two matter systems 110 in transmitter portion 120 or on two matter systems 130 in receiver portion 140. For example, performing a controlled sign operation on two matter systems 110 in the transmitter portion 120 of FIG. 1B includes: 1) producing a probe state from source 122 and directing the probe state through optical system 128 to a first matter system 110; 2) directing the returned light to a displacement operator 126 that is initially configured for a displacement $-\beta$, 3) returning the probe through optical system 128 for interaction with a second matter system 110, 4) directing the returned light to a displacement operator 126 that is then configured for a displacement $-\beta^*$, i.e., the complex conjugate of the previous displacement; 5) returning the probe through optical system 128 for a second interaction with the first matter system 110; 6) directing the returned light to displacement operator 126 that is now configured for a displacements; and 7) returning the probe through optical system 128 for a second interaction with the second matter system 110.

After the above sequence, the probe state is nearly disentangled from the states of the matter systems 110, and since the probe is not measured has little decoherence effect on the matter systems 110. The effect evolution operator $\hat{U}_{cs}$ on states of the matter systems 110 is indicated in Equations 13, where phase shifts $\phi_{00}$, $\phi_{01}$, $\phi_{10}$, and $\phi_{11}$ are all functions of system parameters $\alpha$ and $\theta$.

$$\hat{U}_{cs}|00\rangle=e^{i\phi_{00}}|00\rangle, \hat{U}_{cs}|01\rangle=e^{i\phi_{01}}|01\rangle,$$

$$\hat{U}_{cs}|10\rangle=e^{i\phi_{10}}|10\rangle, \hat{U}_{cs}|11\rangle=e^{i\phi_{11}}|11\rangle$$

Equations 13

To produce a controlled phase operation, local transformations are performed on the matter systems 110 so that only state $|11\rangle$ has a phase shift. In particular, a global phase $e^{i\Phi_{00}}$ is removed from the state of matter systems 110, state rotation system 118 performs a single qubit operation $|1\rangle_1 \rightarrow e^{-i(\phi_{10}-\phi_{00})}|1\rangle_1$, and state rotation system 138 performs a single qubit operation $|1\rangle_2 \rightarrow e^{-i(\phi_{10}-\phi_{00})}|1\rangle_2$. The single qubit operations can be implemented using the light matter interaction of Equation 1 with proper selection of the probe amplitude according to the desired phase shift. Equation 14 indicates the combined effects of evolution operator $\hat{U}_{cs}$ and the local operations. As shown by Equation 14, the combination implements a controlled phase operation with a phase constant $\phi_d = \phi_{00} + \phi_{11} - \phi_{01} - \phi_{10}$, and the phase constant $\phi_d$ can be shown to equal $8\alpha^2 \sin^2\theta(2\cos\theta-\cos 2\theta) \sim 8\alpha^2 \sin^2\theta$. A control sign gate results in the special case where phase constant $\phi_d = \pi$, which occurs when $$\alpha\theta=\sqrt{\frac{\pi}{8}}\approx 0.62.$$

$$|00\rangle \rightarrow |00\rangle, |01\rangle \rightarrow |01\rangle, |10\rangle \rightarrow |10\rangle, \text{ and}$$

$$|11\rangle \rightarrow e^{i(\phi_{00}+\phi_{11}-\phi_{01}-\phi_{10})}|11\rangle$$

Equation 14

A controlled sign operation on two matter systems 130 in the receiver portion 140 of FIG. 1B can be performed using elements 146 and 148 of receiver portion 140 in the same matter as described above for elements 126 and 128 of transmitter portion 120.

A similar process can implement a controlled sign operation on matter systems 110 and 130 in quantum repeater 160 of FIG. 1C, for example, as part of an entanglement swapping process. In station 160, local optical systems 128 and 148 combined with a linking channel 165 perform the routing of the probe state between affected matter systems 110 and 130 and a displacement operator 126 or 146. Otherwise, the controlled sign operation includes a series of steps substantially as described above.

Figure 8A:
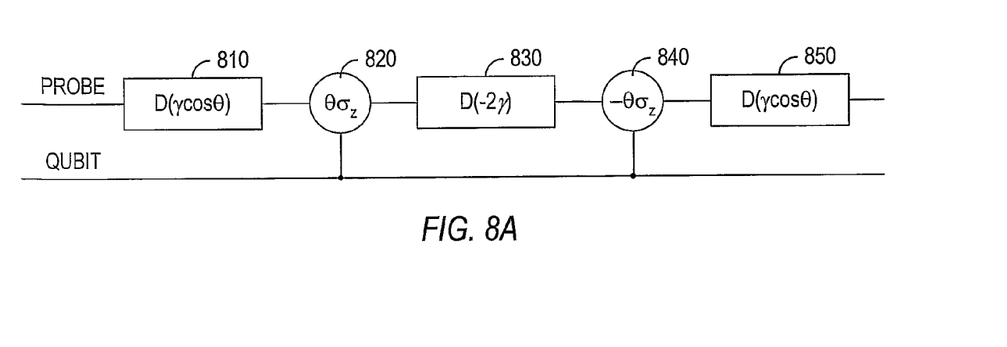
FIG. 8A shows quantum gates associated with a controlled displacement operation in accordance with an embodiment of the invention.

A controlled phase gate in accordance with another embodiment of the invention uses conditional rotations in light probes in matter systems and unconditional displacements of the probe state to build controlled displacement gates and builds a control phase gate from the controlled displacement gates. FIG. 8A illustrates a series of quantum gates 810 to 850 that perform a controlled displacement operation. Gates 810, 830, and 850 are unconditional displacements that can be implemented, for example, using system 126 in transmitter portions 520 of FIG. 5B. As described above, systems 126 can implement a displacement operation using and a beam splitter and a local oscillator having reflectivity and input intensity selected to provide a desired displacement of the probe state.

Gates 820 and 840 are controlled phase gates. Gate 820 can be implemented in a quantum repeater in a transmitter 520 by directing the probe beam into the matter system 510 having a state corresponding to the qubit. As described above, the resulting phase change is conditional in that states $|0\rangle$ and $|1\rangle$ causes opposite phase shifts $\pm\theta$. Gate 840 causes a conditional phase shift that is the negative of the conditional phase shift of gate 820 and can be implemented in transmitter 520 using state rotation system 118 to perform a NOT operation on the qubit before and after directing the probe state into the matter system 510 corresponding to the qubit.

Figure 8B:
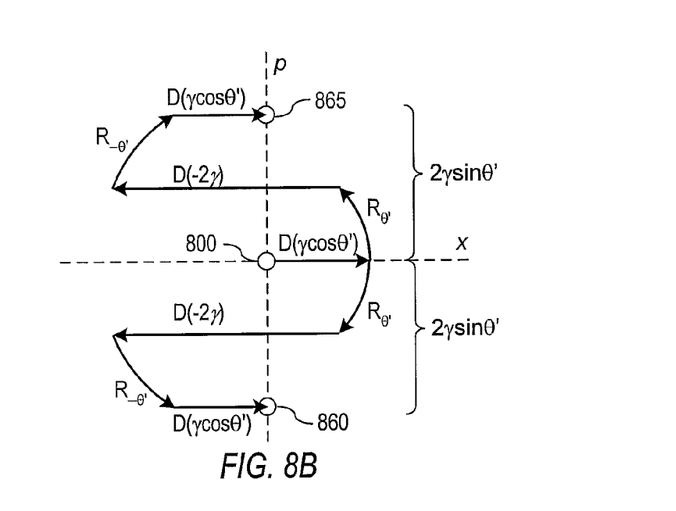
FIG. 8B illustrates the effects of the system of FIG. 8A on a phase space location of a photonic probe state.

The effect in phase space of performing the operations corresponding to quantum gates 810 to 850 is illustrated in FIG. 8B. For an initial probe state having a position 800 in phase space, displacement gate 810 shifts the position along the x axis by a displacement $\gamma \cos \theta'$, where $\gamma$ is an arbitrary constant and $\theta'$ is the magnitude of the phase shifts from the light-matter interaction of Equation 5. Conditional phase gate 820 rotates the position of the probe state in phase space by angle $\theta'$ in counterclockwise and clockwise directions about the origin of phase space respectively for qubit states $|0\rangle$ and $|1\rangle$. Displacement gate 830 shifts the state probe state back along the x axis by a displacement $-2\gamma$. Conditional phase gate 840 rotates the position of the probe state in phase space by angle $\theta'$ in clockwise and counterclockwise directions about the origin of phase space respectively for qubit state $|0\rangle$ and $|1\rangle$. Finally, displacement gate 850 displaces the probe state along the x axis by a displacement $\gamma \cos \theta'$. It can be shown that regardless of the initial probe state, the net effect of these operations is a conditional displacement in phase space in a direction perpendicular to the unconditional displacements 810, 830, and 850, and the magnitude of displacements to final positions 860 and 865 is $2\gamma \sin \theta'$. Accordingly, the exemplary embodiment of FIGS. 8A and 8B produces a controlled displacement $D_c(2i\gamma \sin \theta' \sigma_z)$, where $\sigma_z$ is the Pauli matrix in the computational basis.

The conditional displacement $D_c(2i\gamma \sin \theta' \sigma_z)$ provides another example of a light-matter interaction that can be used for entanglement distribution operations. For example, in link 150 of FIG. 1B, transmitter portion 120 (if using a matter system 110 that provides the light-matter interaction of Equation 5) can perform a controlled displacement operation as described above and transmit the resulting probe state to receiver portion 140. Receiver portion 140 uses a matter system 130 also providing the light-matter interaction of Equation 5 to perform another controlled displacement operation. If the qubit pair are in state $|01\rangle$ or $|10\rangle$, the controlled displacements cancel. States $|00\rangle$ and $|11\rangle$ respectively cause total displacement $4\gamma \sin \theta'$ and $-4\gamma \sin \theta'$. Accordingly, with appropriately initialized states of matter systems 110 and 130, a momentum quadrature measurement can distinguish a desired entangled state containing states $|01\rangle$ and $|10\rangle$ from states containing $|00\rangle$ and $|11\rangle$.

Figure 9:
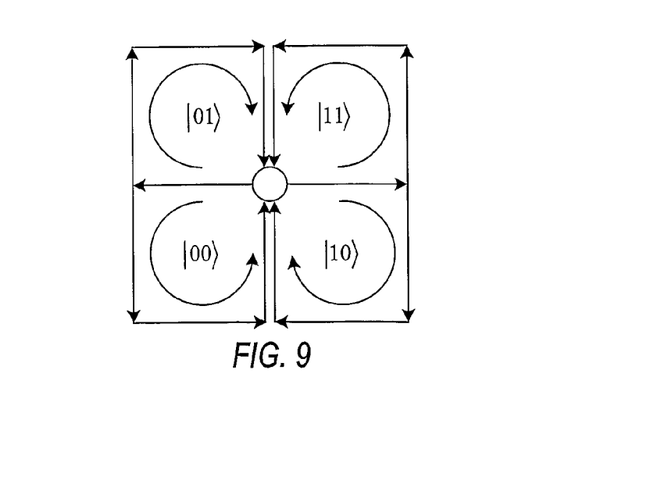
FIG. 9 shows displacements under gone by a probe state during a controlled sign operation in accordance with an embodiment of the invention.

The controlled displacements can also be used to build a controlled phase gate. Equation 15A indicates an evolution operator $\hat{U}'_{CS}$ built using controlled displacement operators $D_c$. FIG. 9 illustrates the effect of evolution operator $\hat{U}_{CS}$ on the position of the probe state in phases space when the two qubits are in states $|00\rangle$, $|01\rangle$, $|10\rangle$, and $|11\rangle$. As shown in FIG. 9, the probe state returns to its initial position in phase space regardless of the state of the qubit. As a result, the probe state completely disentangles from the qubit states. The effect on the qubit states can be derived from Equation 15A using the relation $D_c(b_1)D_c(b_2)=D_c(b_1+b_2) \exp [i\text{Im}(b_1 b_2^*)]$. In particular, Equation 15B shows that evolution operator $\hat{U}'_{CS}$ causes a phase shift $2\beta_1\beta_2$ on states $|00\rangle$ and $|11\rangle$ and a phase shift $-2\beta_1\beta_2$ on states $|01\rangle$ and $|10\rangle$. If the product $\beta_1\beta_2$ is chosen to be equal to $\pi/8$, the phase shifts are $\pm\pi/4$, and a controlled sign gate can be created by combining $\hat{U}'_{CS}$ with single qubit rotations $$e^{i\frac{\pi}{4}\sigma_{Z1}}$$

and $$e^{i\frac{\pi}{4}\sigma_{Z2}}$$

as shown in Equation 15C. An advantage of implementing a controlled sign operation based on Equation 15C is that the implementation does not depend on parameters $\alpha$ or $\theta$ or require that the product $\alpha\theta$ have a particular size. Further, the controlled sign gate is deterministic, i.e., does not depend on a particular measurement result before successful operation.

$$U'_{cs} = D_c(i\beta_2\sigma_{Z2})D_c(\beta_1\sigma_{Z1})D_c(-i\beta_2\sigma_{Z2})D_c(-\beta_1\sigma_{Z1}) \quad \text{Equation 15A}$$

$$U'_{cs} = \exp[i2\beta_1\beta_2\sigma_{Z1}\sigma_{Z2}] \quad \text{Equation 15B}$$

$$e^{i\frac{\pi}{4}}e^{-i\frac{\pi}{4}\sigma_{Z1}}e^{-i\frac{\pi}{4}\sigma_{Z2}}U'_{cs}[|00\rangle + |01\rangle + |10\rangle + |11\rangle] = \quad \text{Equation 15C}$$
$$|00\rangle + |01\rangle + |10\rangle - |11\rangle$$

The controlled sign operations described above can be implemented using the same bright coherent-light resources (e.g., probe state $|\alpha\rangle$ from source 122) and weak light-matter interactions (e.g., in matter systems 110 and 130) as employed in entanglement distribution.

The controlled-sign gate, in addition to single-qubit rotations and measurements (which may also be done by homodyne detection of a bright optical probe) are sufficient resources for entanglement concentration and swapping. With an exemplary entanglement distribution, concentration, and swapping processes, the number of qubits per station 160 grows only logarithmically with distance between end stations, a reasonable communication qubit-rate may be achieved for reasonable gate errors. In this scheme, each repeater station acts autonomously according to a simple set of rules. Throughout the protocol, all stations containing unentangled qubits simultaneously send pulses in order to immediately attempt to generate entanglements at nearest-neighbor stations. Meanwhile, all entangled qubit pairs are purified through a predetermined number of steps, and once this is complete, entanglement swapping occurs to progressively double the distance over which pairs are entangled. After entanglement swapping, concentration can again be attempted, all simultaneous with new entanglement creation at the free qubits. The limiting timescale for these operations is the time for light to propagate along a fiber between stations in order to transmit the entangling pulses and the classical signals that contain the measurement results for entanglement post-selection, concentration, and swapping.

As examples, Monte Carlo simulations of communication over 1280 km with repeater stations separated by 10 km and 16 qubit pairs per link indicate that the rate of entanglement of qubits at end stations has a strong dependence on the number of entanglement concentration steps before and after entanglement swapping. If more concentration steps are used, larger fidelities are possible at slower rates, while fewer concentration steps lead to faster rates at smaller final fidelities. Both the rates and fidelities drop due to local gate errors. Rates of nearly 100 distant pairs per second can be achieved if local losses are sufficiently low.

Coherence time of the matter systems is a concern for quantum communication over long distances. For example, the time for optical information to propagate over 1280 km in optical fibers is about 6 ms, which is already longer than decoherence times observed in many solid-state electronic spin systems at room temperature. To this, one must add the extra time required for the entanglement concentration and swapping operations. In accordance with an aspect of the invention, effective coherence times of matter systems can be extended through the introduction of nuclear memory, because decoherence times for isolated nuclei are at least many seconds. For isolated nuclei, fast ENDOR (electron-nuclear double resonance) pulse techniques may be employed for rapid storage and retrieval of the electron-spin state. See for example, F. Jelezko et al., "Observation of Coherent Oscillation of a Single Nuclear Spin and Realization of a Two-Qubit Conditional Quantum Gate," Phys. Rev. Lett. 93, 130501 (2004). Nuclear ensembles in quantum dots may also be suitable for storage to extend coherence times, but in this case the decoupling-limited memory time is likely to be shorter.

Another technical consideration is that conventional long-distance communication channels and fibers are optimized, i.e., have minimal loss, for telecom wavelengths, while the solid-state sources of coherent light for interactions within a quantum repeater are likely to operate at shorter wavelengths. Accordingly, phase-preserving wavelength conversions of the strong optical probe may be needed before and after transmission on an optical fiber.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A quantum repeater comprising:
   a receiver portion having a measurement system; and
   a transmitter portion, wherein the transmitter portion includes:
      a source of a probe pulse in a probe state having components with different photon numbers;
      a first set of matter systems that respectively store qubits, wherein each matter system has a first quantum state and a second quantum state that provide basis states for the qubit stored in the matter system and wherein the first quantum state is capable of interacting with photons in the probe pulse to change a phase space location of the probe state; and
      a first optical system capable of directing the probe pulse for interaction with one of the matter systems and directing light emerging from the matter system for transmission on a first channel.

2. The quantum repeater of claim 1, wherein the receiver portion comprises:
   a second set of matter systems, wherein each matter system in the second set has at least one state that is capable of interacting with the photons in the probe pulse to change the phase space location;
   a second optical system capable of directing light received from a second channel for interaction with one of the matter systems in the second set and directing light emerging from the matter system into the measurement system.

3. The quantum repeater of claim 2, wherein the measurement system measures a momentum quadrature of the probe state.

4. The quantum repeater of claim 1, wherein the source comprises a laser that produces a coherent state from which the probe state is initially formed.

5. The quantum repeater of claim 1, wherein the probe state is selected from a group consisting of a coherent state, a squeezed state, a cat state, and a NOON state.

6. The quantum repeater of claim 1, wherein each of the matter systems comprises an electronic spin system inside a cavity, wherein the cavity is approximately resonant with a wavelength of the probe pulse.

7. The quantum repeater of claim 1, wherein in each of the matter systems, an interaction of the photons in the probe pulse with the first quantum state causes in a first phase shift.

8. The quantum repeater of claim 7, wherein an interaction of the photons in the probe pulse with the second quantum state causes in a second phase shift that is not equal to the first phase shift.

9. The quantum repeater of claim 1, wherein the second quantum state does not interact with the photons in the probe pulse.

10. The quantum repeater of claim 1, wherein the first channel comprises an optical fiber.

11. A quantum repeater link, comprising:
   a first transmitter portion that includes:
      a first source of a first probe pulse in a first probe state having components with different photon numbers;
      a first set of matter systems that respectively store qubits, wherein each matter system has a first quantum state and a second quantum state that provide basis states for the qubit stored in the matter system and wherein the first quantum state is capable of interacting with photons in the first probe pulse to change a phase space location of the first probe state; and
      a first optical system capable of directing the probe pulse for interaction with one of the matter systems and directing light emerging from the matter system for transmission on a first channel;
   a second transmitter portion that includes:
      a second source of a second probe pulse in a second probe state having components with different photon numbers;
      a second set of matter systems, wherein each matter system has at least one state that is capable of interacting with the photons in the second probe pulse to change the phase space location of the second probe state; and a second optical system capable of directing the second probe pulse for interaction with one of the matter systems in the second set and directing light emerging from the matter system for transmission on a second channel; and a measurement station coupled to the first and second channels.

12. The link of claim 11, wherein the measurement station comprises:
a beam splitter positioned to receive light from the first and second channels; and
a measurement system positioned to measure output from the beam splitter.

13. A quantum communication system comprising a plurality of links, wherein in each of the links comprises:
a first photonic channel;
a first station connected to a first end of the first photonic channel, the first station including:
a source of a first probe pulse in a probe state having components with different photon numbers;
a first set of matter systems, wherein each matter system has at least one quantum state capable of interacting with photons in the first probe pulse to change a phase space location of the probe state; and
a first optical system capable of directing the first probe pulse for interaction with one of the matter systems and directing light emerging from the matter system for transmission on the first photonic channel; and
a second station connected to a second end of the first photonic channel, wherein the second station comprises:
a second set of matter systems, wherein each matter system in the second set has at least one quantum state capable of interacting with the photons in the first probe pulse to change the phase space location;
a measurement system; and
a second optical system capable of directing light received from the first photonic channel for interaction with one of the matter systems in the second set and directing light emerging from the matter system into the measurement system.

14. A process for entangling quantum states of matter systems in the quantum communication system of claim 13, the process in at least one of the links comprising:
directing the first probe pulse to interact with a first matter system selected from the plurality of first matter systems in the first station;
transmitting the first probe pulse from the first matter system through the first optical system and through the first photonic channel that connects the first station to the second station;
directing the first probe pulse to interact with a second matter system selected from the plurality of second matter systems that are in the second station; and
measuring the first probe pulse with the measurement system, after the first probe pulse interacts with the first matter system and the second matter system to thereby determine a first measurement result, wherein the first measurement result is indicative of entanglement of the first and second matter systems.

15. The process of claim 14, wherein the probe state is selected from a group consisting of a coherent state, a squeezed state, a cat state, and a NOON state.

16. The process of claim 14, wherein the first measurement result indicates a phase shift caused by interactions of the probe pulse with the first matter system and the second matter system.

17. The process of claim 14, further comprising:
directing a second probe pulse to interact with a third matter system in the first station, wherein the second probe pulse is in a probe state having components with different photon numbers;
directing the second probe pulse to interact with a fourth matter system that is in the second station; and
measuring the second probe pulse after the second probe pulse interacts with the third matter system and the fourth matter system to thereby determine a second measurement result, wherein the second measurement result is indicative of entanglement of the second and third matter systems.

18. The process of claim 17, wherein the first and second measurement results indicate that the first and second matter systems are entangled and the third and fourth matter systems are entangled, and wherein the process further comprises performing an entanglement concentration operation that destroys entanglement of the third and fourth matter systems to increase an entanglement fidelity of the first and second matter systems.

19. A quantum communication system comprising a plurality of links, wherein each of the links further comprises:
a first photonic channel;
a first station connected to a first end of the first photonic channel, the first station including:
a source of a first probe pulse in a probe state having components with different photon numbers;
a first set of matter systems, wherein each matter system has at least one quantum state capable of interacting with photons in the first probe pulse to change a phase space location of the probe state; and
a first optical system capable of directing the first probe pulse for interaction with one of the matter systems and directing light emerging from the matter system for transmission on the first photonic channel; and
a second station connected to a second end of the first photonic channel a second photonic channel having a first end connected to the second station; and
a third station connected to a second end of the second photonic channel, wherein:
the third station can transmit a second probe pulse through the second photonic channel to the second station; and
the second station comprises a measurement system adapted to measure the first and second probe pulses.

20. A process for entangling quantum states of matter systems in the quantum communication system of claim 19, the process in at least one of the links comprising:
directing the first probe pulse to interact with a first matter system selected from the plurality of first matter systems in the first station, wherein the first probe pulse is in a probe state having components with different photon numbers;
transmitting the first probe pulse from the first matter system through the first optical system and through the first photonic channel that connects the first station to the second station;
directing the second probe pulse to interact with a second matter system that is in the third station; and
transmitting the second probe pulse through the second photonic channel that connects the second station to the measurement station; and performing a measurement on the first and second probe pulses in the second station, wherein the measurement provides a result that is indicative of entanglement of the first and second matter systems.

21. The process of claim 20, wherein the second probe pulse is in a probe state having components with different photon numbers.

22. The process of claim 20, wherein performing the measurement comprises:
- directing the first and second probe pulses through input ports of a beam splitter; and
- measuring an output from the beam splitter.

23. A process for implementing a quantum gate, comprising:
- directing a probe pulse that is in a probe state into a first matter system that is in a first state representing a first qubit, wherein interaction of the probe pulse with the first matter system causes a conditional phase shift in the probe state;
- performing a first displacement operation on the probe pulse, wherein the first displacement operation introduces a first displacement to the probe pulse;
- directing the probe pulse into a second matter system that is in a second state representing a second qubit, wherein interaction of the probe pulse with the second matter system causes a conditional phase shift in the probe state;
- performing a second displacement operation on the probe pulse, wherein the second displacement operation introduces a second displacement to the probe pulse, the second displacement being a complex conjugate of the first displacement;
- directing the probe pulse back into the first matter system, wherein further interaction of the probe pulse with the first matter system causes a conditional phase shift in the probe state;
- performing a third displacement operation on the probe pulse, wherein the third displacement operation introduces a third displacement to the probe pulse, the third displacement being a negative of the first displacement; and
- directing the probe pulse back into the second matter system, wherein further interaction of the probe pulse with the second matter system causes a conditional phase shift in the probe state.

24. The process of claim 23, wherein the first displacement is equal to a product of an amplitude of the probe state and a constant $i-1$.

25. A process for implementing a quantum gate, comprising
- performing a first displacement operation on a probe pulse that is in a probe state, wherein the first displacement operation introduces a first displacement to the probe state;
- directing the probe pulse into a first matter system that is in a first state representing a first qubit, wherein interaction of the probe pulse with the first matter system causes a first conditional phase shift in the probe state;
- performing a second displacement operation on the probe pulse, wherein the second displacement operation introduces a second displacement to the probe state;
- performing a second conditional phase shift on the probe state; and
- performing a third displacement operation on the probe pulse, wherein the third displacement operation introduces a third displacement to the probe state, the third displacement being equal to the first displacement.

26. The process of claim 25, wherein a ratio of a magnitude of the first displacement to a magnitude of the second displacement is $$\frac{\cos\theta}{2},$$

and θ is phase constant of the first and the second conditional phase shifts.

* * * * *